United States Patent [19]

Schwegler

[11] Patent Number: 5,538,034
[45] Date of Patent: Jul. 23, 1996

[54] VALVE

[75] Inventor: Rudolf Schwegler, Zurich-Kusnacht, Switzerland

[73] Assignee: Emhart Glass Machinery Investments Inc., Wilmington, Del.

[21] Appl. No.: 347,625

[22] Filed: Dec. 1, 1994

[30] Foreign Application Priority Data

Dec. 4, 1993 [GB] United Kingdom .................. 9324930

[51] Int. Cl.⁶ .................................................. F16K 15/04
[52] U.S. Cl. ........................................ 137/454.5; 137/512
[58] Field of Search ............................. 137/454.2, 454.4, 137/454.5, 512

[56] References Cited

U.S. PATENT DOCUMENTS 1,861,674  6/1932  Winterhoff ........................... 137/454.4
2,067,713  1/1937  Kommer ............................... 137/454.5
3,050,080  8/1962  Pagano ............................. 137/454.5 X
3,941,145  3/1976  Morain et al. .................... 137/454.5 X

FOREIGN PATENT DOCUMENTS 600339  6/1960  Canada ................................ 137/454.5

*Primary Examiner*—Stephen M. Hepperle
*Attorney, Agent, or Firm*—Spencer T. Smith

[57] ABSTRACT

A one-way valve of simple construction comprises a body provided with appropriate bores and four legs. A ball is positioned between the legs which are then bent towards each other to retain the ball in the body.

3 Claims, 2 Drawing Sheets

VALVE

This invention is concerned with improvement in one way valves in pneumatic mechanism.

BACKGROUND TO THE INVENTION

Glass machines are generally pneumatically operated, and there is a need for one way valves which are reliable in operation but yet cheap to manufacture and easy to replace.

It is an object of the invention to provide an improved one way valve which will be cheap to manufacture and versatile in use.

BRIEF DESCRIPTION OF THE INVENTION

The present invention provides a one way valve for use in a pneumatic circuit comprising a body comprising a head portion adapted for locating the valve in a bore, a sleeve portion extending from the head portion a valve seating formed in the sleeve portion around an air opening the sleeve portion comprising a plurality of legs separated by longitudinally extending gaps a ball positioned in the sleeve portion and adapted to seat on the valve seating the legs of the sleeve portion being bent inwardly so that they restrict the movement of the ball away from the valve seating.

There now follows a description of three valves embodying the invention which description is to be read with reference to the accompanying drawings in which FIG. 1 shows a sectional view of a first valve embodying the invention and in an open condition.

DESCRIPTION OF THE PREFERRED EMBODIMENTS

Figure 1:
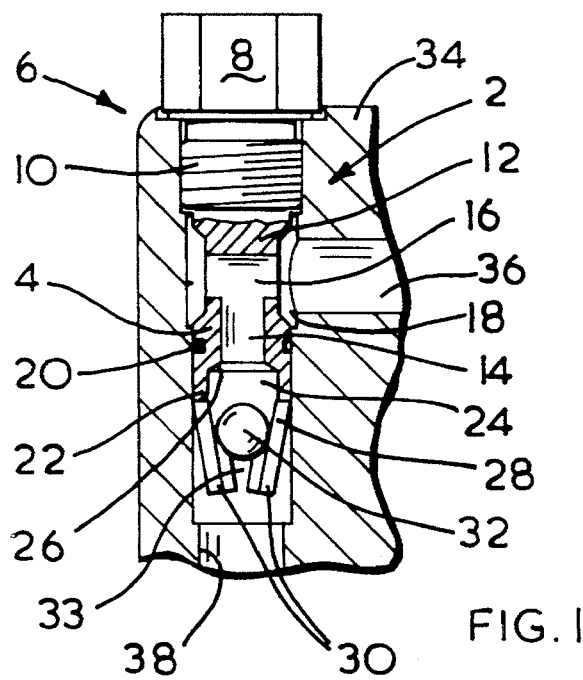

The first valve 2 is for use in a pneumatic circuit and comprises a valve body 4 having a head portion 6 which is adapted for locating the valve in an aperture, comprising a hexagonal head 8, a screw threaded portion 10, and a cylindrical portion 12 which extends from the threaded portion 10. The cylindrical portion 12 comprises a first axial bore 14 and a transverse bore 16 in communication with the axial bore 14. An annular recess 18 surrounds the portion 12 in the vicinity of the transverse bore 16.

A sealing ring 20 is provided adjacent the recess 18 further from the screw threaded portion 10.

A sleeve portion 22 of the body 4 extends from the cylindrical portion 12 of the head portion 6 and comprises a second axial bore 24 of greater diameter than the first axial bore 14. A circular valve seating 26 is provided at the junction of the sleeve portion 22 and the cylindrical portion 12, having an inclined seating face extending from the bore 24 inwardly to the bore 14 which provides an air opening.

An end portion 28 of the sleeve portion 22 is split from a level spaced from the valve seating 26 to provide a plurality, in this case four, of legs 30 separated by longitudinally extending gaps 31. The legs are bent radially inwards to provide a part conical recess, and a ball 32 is retained in this recess between an air opening 33 provided by the spaces between the legs 30 and the valve seating 26. The ball is of a diameter intermediate between the diameters of the bore.

FIG. 1 shows the valve 2 in position in a block 34 comprising a transverse air passage 36 and another air passage 38, at right angles to the passage 36. The valve 2 is screwed into an appropriate threaded portion of the passage 38 so that the annular recess 18 is in line with the passage 36. If the pressure of air in the passage 36 is greater than that in the passage 38, the ball 32 is forced away from the seating 26 and air may pass from passage 34 to passage 36. If the pressure of the air in the passage 38, is greater than that in the passage 36 the ball 32 is forced onto the seating 26 thus to close the valve and prevent passage of air from the passage 38 to the passage 36.

Figure 3:
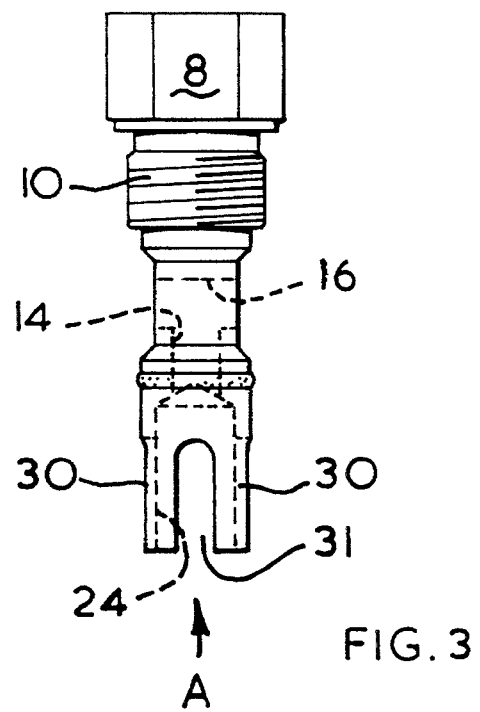
FIG. 3 shows a valve body of the first valve in process of manufacture.
Figure 4:
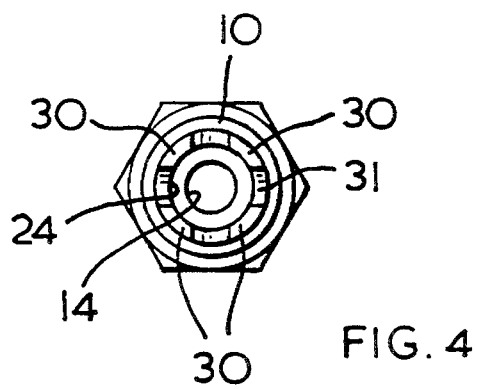
FIG. 4 shows a view of the valve body of the first valve in the direction of the arrow A in FIG. 3.

The first valve 2 will operate in any orientation and comprises no springs. It is very economical in manufacture—a valve body 4 as shown in FIG. 3 is made by conventional processes, the legs 30 being formed by slots 31 milled in the sleeve portion 22 of the valve body. A ball 32 is then positioned in the bore 24 and the legs 30 deformed radially inwards to provide the valve as shown in FIG. 1.

It has been found that the resilience of the legs 30 in the valve 2 reduces wear on the ball 32 in comparison with conventional ball valves, and the life of the valve 2 in situations of frequent and repetitive operation is very good.

The second valve 40 (FIGS. 5 & 7) in many way resembles the first valve and is again a one way valve intended for use in a pneumatic circuit. The valve 40 comprises a valve body 42 having a head portion 44 which is adapted for locating the valve 40 in an aperture. The head 40 comprising a parallel sided lug 46 and a cylindrical portion 48. In a groove 50 in the portion 48 is a sealing ring 52.

A sleeve portion 54 of the valve 40 fits closely over a reduced end portion 56 of the cylindrical portion 48 and is fixed in position by a pin 58. The sleeve portion 54 comprises an axial end opening 60 spaced from the head portion and formed in a collar 61 which end opening provides an air opening around which is positioned a valve seating 62 formed on the collar 61. The sleeve portion 54 comprises a plurality, namely four, of legs 64 separated by longitudinally extending gaps 66. A valve ball 68 is portioned in the sleeve portion 54 and is adapted to seat on the valve seating 62. The legs 64 of the sleeve portion are bent inwardly to restrain movement of the ball away from the valve seating.

Manufacture of the valve 40 involves the following. A valve ball 68 is placed into a sleeve portion 54 of which the legs 64 have not yet been bent inwardly. The legs are then bent inwardly to restrain the ball 68 between the legs and the valve seating 62, and the sleeve portion 54 is then assembled to the head portion 44 by pushing it over the reduced portion 56, and a pin 58 then inserted to retain it in position.

Figure 7:
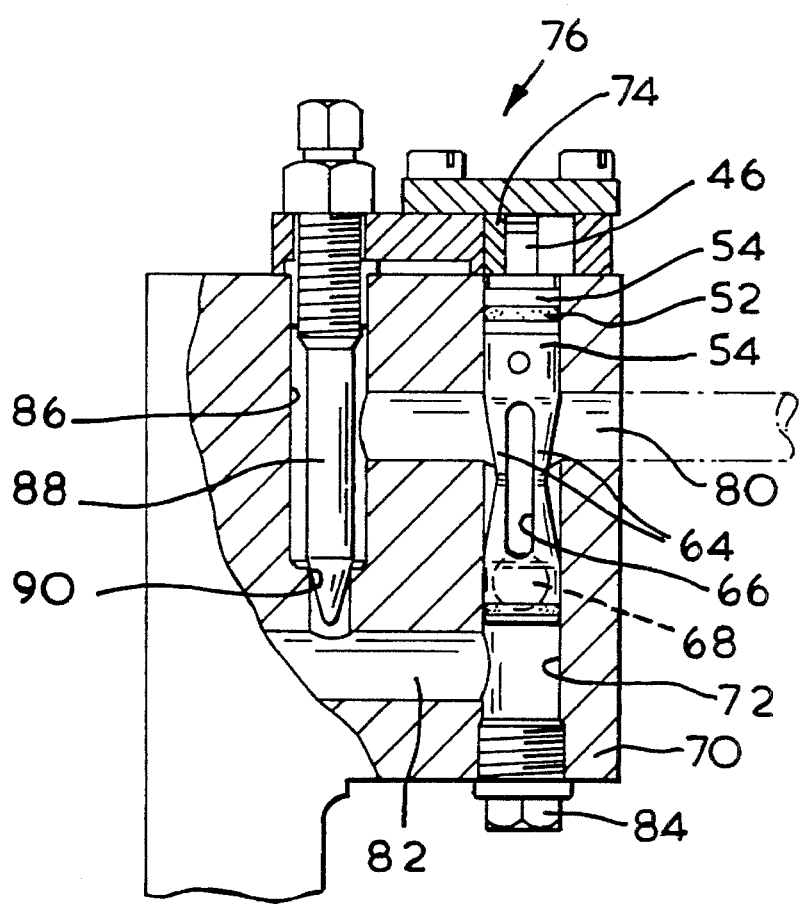
FIG. 7 shows a sectioned view of the second valve installed in a valve block.

FIG. 7 shows the valve 40 in position in a valve block 70. The valve is positioned in a bore 72 of the block and a locating bar 74 of a clamping device 76 locates the valve in axial position. A pin (not shown) may secure the head portion 44 of the valve 40 to the bar 74, extending through a hole 78 in the lug 46.

A first transverse bore 80 is positioned level with the upper end portions of the gaps 66 of the sleeve portion 54. A second transverse bore 82 leads into the bore 72 below the end opening 60 of the valve: the bore 72 is closed by a plug 84.

A vertical bore 86 extends from the bore 82 and is intersected by the transverse bore 80: a needle valve arrangement comprises an adjustable needle 88 mounted in the clamping device 76 and extending through the bore 86 and is spaced a desired distance from a valve seating 90.

The arrangement shown in FIG. 7 is typical of the arrangement of one of a series of valves in a valve block of a conventional I.S. machine for the manufacture of glass containers, and controls the supply of air to a piston and cylinder device (not shown) which is connected to the bore 80.

In a first condition of the valve 40, compressed air is supplied to the transverse bore 82. A small proportion of this air passes between the valve seating 90 and the needle 88 into the bore 80. A major proportion of this air passes into the bore 72 and through the end opening 60 of the valve 40, holding the valve ball 68 against the inwardly bent portions of the legs 64. This air can thus pass freely through the gaps 66 into the bore 80 and thence to the piston and cylinder device.

In a second condition of the valve 40 the transverse bore 82 is connected to exhaust, and air under pressure is provided to the bore 80 from the piston and cylinder device. This air forces the valve ball 68 against the valve seating 62, thus preventing any passage of air through the end opening 60 into the bore 72. The compressed air thus is constrained to pass through the bore 80 into the bore 86 and between the needle 88 and the valve seating 90 at a rate determined by the setting of the needle 88.

Figure 6:
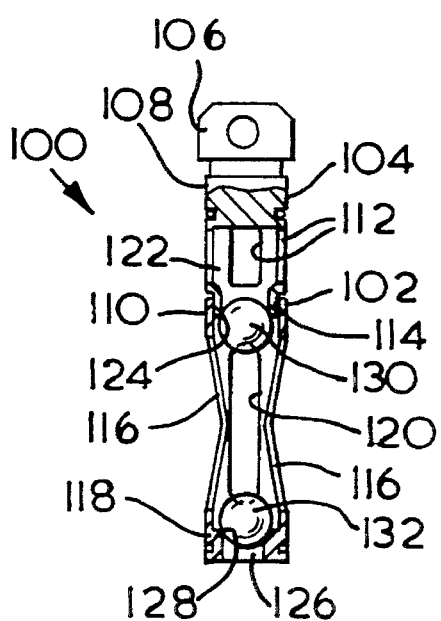
FIG. 6 shows a sectioned view of a third valve embodying the invention.

FIG. 6 shows a third valve, 100. This is a valve which may be used in two different ways, either as a one way ball valve or as a flat check valve.

The valve 100 comprises a body 102 having head portion 104 adapted for locating the valve in a bore. The head portion 104 comprises a parallel sided lug 106 and a cylindrical head portion 108. Extending from the portion 108 (being a force fit on a reduced end of the portion 108) is a sleeve portion 110. The sleeve portion 110 comprises a series of circumferential openings 112, a first collar 114, a plurality, i.e. four, legs 116 extending from the first collar 114 to a second collar 118, the legs 116 being separated by four longitudinally extending gaps 120.

The first collar 114 provides an end opening 122 and a first valve seating 124 formed around an air opening which leads to the end opening 122.

The second collar 118 provides an end opening 126 and a second valve seating 128 formed around an air opening which leads to the end opening 126.

Two balls 130, 132, are positioned in the sleeve portion 110. The first ball 130 is adapted to seat on the first valve seating 124; the second ball 132 is adapted to seat on the second valve seating 128. The legs 116 of the sleeve portion 110 are bent inwardly, with the balls on opposite sides of the inwardly bent portions; thus the inwardly bent legs restrain movement of the first ball 130 away from the first seating 124 and the second ball 132 away from the second seating 128.

Figure 2:
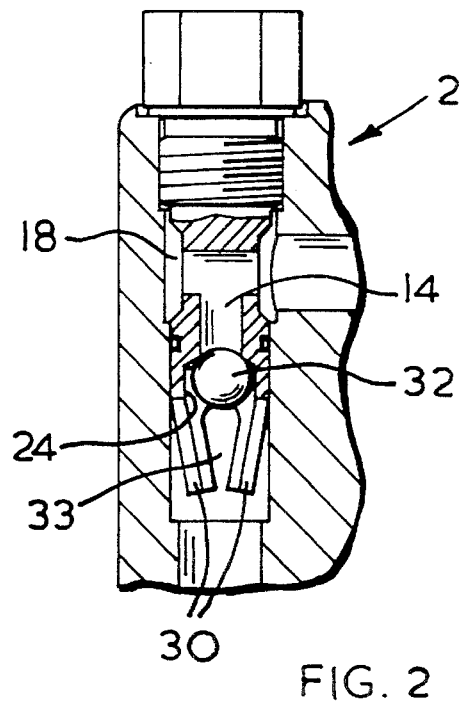
FIG. 2 shows a sectional view of the first valve in a closed condition.
Figure 5:
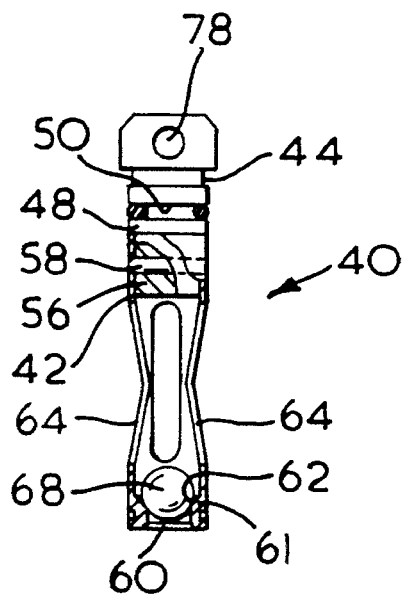
FIG. 5 shows a sectioned view of a second valve embodying the invention.

The valve 100 may be used either in the manner of the first valve (see FIGS. 1 & 2) or in the manner of the second valve (see FIG. 5 & 7). If used in the manner of the first valve, one air connection is made to the end opening 122 of the valve through the openings 112 the other air connection is made to the valve through the gaps 120, and the ball 130 operates in a fashion analogous to the ball 32, while the ball 132 is inoperative. If used in the manner of the second valve, one air connection is made to the end opening 126 of the valve, the other air connection is made through the gaps 120, and the ball 130 is inoperative.

The third valve is particularly useful in conjunction with a valve block which has a series of standard bores adapted to receive either a valve to operate as the first valve or a valve to operate as the second valve. By the proper design of these bores and the connections thereto, a valve as the third valve can be utilized in all of the bores, thus avoiding both the necessity to stock two kinds of valve and the necessity of selecting the right valve to replace in each bore.

I claim:

1. A one way valve for use in a pneumatic circuit comprising a body comprising a head portion adapted for locating the valve in a bore, a sleeve portion extending from the head portion, a valve seating formed in the sleeve portion, at the end of said sleeve portion remote from said head portion around an air opening, the sleeve portion comprising a plurality of legs separated by longitudinally extending gaps, said legs extending from said head portion to said valve seating a ball positioned in the sleeve portion and adapted to seat on the valve seating, said legs of the sleeve portion being bent inwardly intermediate said head portion and said valve seating so that they restrict the movement of the ball away from said valve seating.

2. A valve according to claim 1, wherein said head portion includes a second valve seating formed around an air opening and further comprising a second ball positioned in said sleeve portion intermediate said head portion and the location where said legs are bent inwardly.

3. A valve according to claim 2, wherein there are four legs.

\* \* \* \* \*